(12) United States Patent
Suciu et al.

(10) Patent No.: US 7,921,636 B2
(45) Date of Patent: Apr. 12, 2011

(54) TIP TURBINE ENGINE AND CORRESPONDING OPERATING METHOD

(75) Inventors: Gabriel Suciu, Glastonbury, CT (US); James W. Norris, Lebanon, CT (US); Craig A. Nordeen, Manchester, CT (US); Brian Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 994 days.

(21) Appl. No.: 11/719,887

(22) PCT Filed: Dec. 1, 2004

(86) PCT No.: PCT/US2004/039979
§ 371 (c)(1),
(2), (4) Date: May 22, 2007

(87) PCT Pub. No.: WO2006/059977
PCT Pub. Date: Jun. 8, 2006

(65) Prior Publication Data
US 2009/0232650 A1    Sep. 17, 2009

(51) Int. Cl.
*F02K 3/02* (2006.01)
(52) U.S. Cl. .................................... 60/226.1
(58) Field of Classification Search ............... 60/39.43, 60/226.1, 269, 262; 415/77; 416/175, 203, 416/193 R
See application file for complete search history.

(56) References Cited

U.S. PATENT DOCUMENTS

| | | |
|---|---|---|
| 1,544,318 A | 6/1925 | Hodgkinson |
| 2,221,685 A | 11/1940 | Smith |
| 2,414,410 A | 1/1947 | Griffith |
| 2,499,831 A | 3/1950 | Palmatier |
| 2,548,975 A | 4/1951 | Hawthorne |
| 2,611,241 A | 9/1952 | Schulz |
| 2,620,554 A | 12/1952 | Mochel et al. |
| 2,698,711 A | 1/1955 | Newcomb |
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,630 A | 11/1961 | Busquet |
| 3,037,742 A | 6/1962 | Dent et al. |
| 3,042,349 A | 7/1962 | Pirtle et al. |

(Continued)

FOREIGN PATENT DOCUMENTS

DE    1173292    7/1964

(Continued)

*Primary Examiner* — Michael Cuff
*Assistant Examiner* — Andrew Nguyen
(74) *Attorney, Agent, or Firm* — Carlson, Gaskey & Olds, P.C.

(57) ABSTRACT

A tip turbine engine has a more efficient core airflow path from the hollow fan blades, through the combustor and to the combustion chamber of a combustor. The turbine engine includes a rotatable fan having a plurality of radially-extending fan blades each defining compressor chambers extending radially therein. A turbine is mounted to the outer periphery of the fan. A diffuser at a radially outer end of each compressor chamber turns core airflow through the compressor chamber toward the combustor. The high velocity, high pressure core airflow from the compressor chambers in the hollow fan blades is diffused before the compressed core airflow enters the combustor, thereby improving the efficiency of the tip turbine engine. Further, the overall diameter of the tip turbine engine is reduced by the arrangement of the diffuser case in a position not directly radially outward of the fan blades.

18 Claims, 3 Drawing Sheets

U.S. PATENT DOCUMENTS

| | | | |
|---|---|---|---|
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |
| 3,267,667 A | 8/1966 | Erwin |
| 3,269,120 A | 8/1966 | Sabatiuk |
| 3,283,509 A | 11/1966 | Nitsch |
| 3,286,461 A | 11/1966 | Johnson |
| 3,302,397 A | 2/1967 | Davidovic |
| 3,363,419 A | 1/1968 | Wilde |
| 3,404,831 A | 10/1968 | Campbell |
| 3,465,526 A | 9/1969 | Emerick |
| 3,496,725 A | 2/1970 | Ferri et al. |
| 3,505,819 A | 4/1970 | Wilde |
| 3,616,616 A | 11/1971 | Flatt |
| 3,684,857 A | 8/1972 | Morley et al. |
| 3,703,081 A | 11/1972 | Krebs et al. |
| 3,705,775 A | 12/1972 | Rioux |
| 3,720,060 A | 3/1973 | Davies et al. |
| 3,729,957 A | 5/1973 | Petrie et al. |
| 3,735,593 A | 5/1973 | Howell |
| 3,811,273 A | 5/1974 | Martin |
| 3,818,695 A | 6/1974 | Rylewski |
| 3,836,279 A | 9/1974 | Lee |
| 3,861,822 A | 1/1975 | Wanger |
| 3,932,813 A | 1/1976 | Gallant |
| 3,979,087 A | 9/1976 | Boris et al. |
| 4,005,575 A | 2/1977 | Scott et al. |
| 4,130,379 A | 12/1978 | Partington |
| 4,147,035 A | 4/1979 | Moore et al. |
| 4,251,185 A | 2/1981 | Karstensen |
| 4,251,987 A | 2/1981 | Adamson |
| 4,265,646 A | 5/1981 | Weinstein et al. |
| 4,271,674 A | 6/1981 | Marshall et al. |
| 4,298,090 A | 11/1981 | Chapman |
| 4,326,682 A | 4/1982 | Nightingale |
| 4,452,038 A | 6/1984 | Soligny |
| 4,463,553 A | 8/1984 | Boudigues |
| 4,561,257 A | 12/1985 | Kwan et al. |
| 4,563,875 A | 1/1986 | Howald |
| 4,631,092 A | 12/1986 | Ruckle et al. |
| 4,751,816 A | 6/1988 | Perry |
| 4,785,625 A | 11/1988 | Stryker et al. |
| 4,817,382 A | 4/1989 | Rudolph et al. |
| 4,834,614 A | 5/1989 | Davids et al. |
| 4,883,404 A | 11/1989 | Sherman |
| 4,887,424 A | 12/1989 | Geidel et al. |
| 4,904,160 A | 2/1990 | Partington |
| 4,912,927 A | 4/1990 | Billington |
| 4,965,994 A | 10/1990 | Ciokajlo et al. |
| 4,999,994 A | 3/1991 | Rud et al. |
| 5,010,729 A | 4/1991 | Adamson et al. |
| 5,012,640 A | 5/1991 | Mirville |
| 5,014,508 A | 5/1991 | Lifka |
| 5,088,742 A | 2/1992 | Catlow |
| 5,107,676 A | 4/1992 | Hadaway et al. |
| 5,157,915 A | 10/1992 | Bart |
| 5,182,906 A | 2/1993 | Gilchrist et al. |
| 5,224,339 A | 7/1993 | Hayes |
| 5,232,333 A | 8/1993 | Girault |
| 5,267,397 A | 12/1993 | Wilcox |
| 5,269,139 A | 12/1993 | Klees |
| 5,275,536 A | 1/1994 | Stephens et al. |
| 5,315,821 A | 5/1994 | Dunbar et al. |
| 5,328,324 A | 7/1994 | Dodd |
| 5,443,590 A | 8/1995 | Ciokajlo et al. |
| 5,466,198 A | 11/1995 | McKibbin et al. |
| 5,497,961 A | 3/1996 | Newton |
| 5,501,575 A | 3/1996 | Eldredge et al. |
| 5,537,814 A | 7/1996 | Nastuk et al. |
| 5,584,660 A | 12/1996 | Carter et al. |
| 5,628,621 A | 5/1997 | Toborg |
| 5,746,391 A | 5/1998 | Rodgers et al. |
| 5,769,317 A | 6/1998 | Sokhey et al. |
| 6,004,095 A | 12/1999 | Waitz et al. |
| 6,095,750 A | 8/2000 | Ross et al. |
| 6,102,361 A | 8/2000 | Riikonen |
| 6,158,207 A | 12/2000 | Polenick et al. |
| 6,223,616 B1 | 5/2001 | Sheridan |
| 6,244,539 B1 | 6/2001 | Lifson et al. |
| 6,364,805 B1 | 4/2002 | Stegherr |
| 6,381,948 B1 | 5/2002 | Klingels |
| 6,382,915 B1 | 5/2002 | Aschermann et al. |
| 6,384,494 B1 | 5/2002 | Avidano et al. |
| 6,430,917 B1 | 8/2002 | Platts |
| 6,454,535 B1 | 9/2002 | Goshorn et al. |
| 6,471,474 B1 | 10/2002 | Mielke et al. |
| RE37,900 E | 11/2002 | Partington |
| 6,513,334 B2 | 2/2003 | Varney |
| 6,619,030 B1 | 9/2003 | Seda et al. |
| 6,851,264 B2 | 2/2005 | Kirtley et al. |
| 6,883,303 B1 | 4/2005 | Seda |
| 6,910,854 B2 | 6/2005 | Joslin |
| 7,021,042 B2 | 4/2006 | Law |
| 7,214,157 B2 | 5/2007 | Flamang et al. |
| 2002/0190139 A1 | 12/2002 | Morrison |
| 2003/0031556 A1 | 2/2003 | Mulcaire et al. |
| 2003/0131602 A1 | 7/2003 | Ingistov |
| 2003/0131607 A1 | 7/2003 | Daggett |
| 2003/0192304 A1 | 10/2003 | Paul |
| 2004/0025490 A1 | 2/2004 | Paul |
| 2004/0070211 A1 | 4/2004 | Franchet et al. |
| 2004/0189108 A1 | 9/2004 | Dooley |
| 2004/0219024 A1 | 11/2004 | Soupizon et al. |
| 2005/0008476 A1 | 1/2005 | Eleftheriou |
| 2005/0127905 A1 | 6/2005 | Proctor et al. |
| 2005/0138914 A1* | 6/2005 | Paul ............... 60/226.1 |

FOREIGN PATENT DOCUMENTS

| | | |
|---|---|---|
| DE | 3942042 | 6/1991 |
| EP | 1319896 | 6/2003 |
| FR | 1033849 | 7/1953 |
| GB | 1287223 | 8/1972 |
| GB | 2026102 | 1/1980 |
| JP | 10184305 | 7/1998 |
| WO | 0127534 | 4/2001 |
| WO | 2004011788 | 2/2004 |
| WO | 2004092567 | 10/2004 |
| WO | 2006059975 | 6/2006 |
| WO | 2006059977 | 6/2006 |
| WO | 2006059992 | 6/2006 |
| WO | 2006060004 | 6/2006 |

* cited by examiner

TIP TURBINE ENGINE AND CORRESPONDING OPERATING METHOD

The present invention relates to a tip turbine engine, and more particularly to a novel core airflow path for a tip turbine engine.

An aircraft gas turbine engine of the conventional turbofan type generally includes a forward bypass fan and a low pressure compressor, a middle core engine, and an aft low pressure turbine, all located along a common longitudinal axis. A high pressure compressor and a high pressure turbine of the core engine are interconnected by a high spool shaft. The high pressure compressor is rotatably driven to compress air entering the core engine to a relatively high pressure. This high pressure air is then mixed with fuel in a combustor, where it is ignited to form a high energy gas stream. The gas stream flows axially aft to rotatably drive the high pressure turbine, which rotatably drives the high pressure compressor via the high spool shaft. The gas stream leaving the high pressure turbine is expanded through the low pressure turbine, which rotatably drives the bypass fan and low pressure compressor via a low spool shaft.

Although highly efficient, conventional turbofan engines operate in an axial flow relationship. The axial flow relationship results in a relatively complicated elongated engine structure of considerable length relative to the engine diameter. This elongated shape may complicate or prevent packaging of the engine into particular applications.

A recent development in gas turbine engines is the tip turbine engine. Tip turbine engines locate an axial compressor forward of a bypass fan which includes hollow fan blades that receive airflow from the axial compressor therethrough such that the hollow fan blades operate as a centrifugal compressor. Compressed core airflow from the hollow fan blades is mixed with fuel in an annular combustor, where it is ignited to form a high energy gas stream which drives the turbine that is integrated onto the tips of the hollow bypass fan blades for rotation therewith as generally disclosed in U.S. Patent Application Publication Nos.: 20030192303; 20030192304; and 20040025490. The tip turbine engine provides a thrust-to-weight ratio equivalent to or greater than conventional turbofan engines of the same class, but within a package of significantly shorter length.

In the known tip turbine engines, most of the core airflow flows radially outwardly from the radial outer ends of the hollow fan blades into the combustor, which is mounted about the periphery of the fan. A fuel injector aft of the fan delivers fuel into the combustor where it is ignited. The high-energy gas stream is then directed axially forward in the combustor, then redirected radially inward and then turned once again axially rearward to pass through turbine blades between the fan blades to rotatably drive the fan. This design has some drawbacks. Mounting the combustor about the periphery of the fan increases the overall diameter of the known tip turbine engine.

Additionally, in the known tip turbine engines, the compressed airflow from the hollow fan blades exits directly into the combustor. A lack of diffusion between the centrifugal compressor and the combustor causes a large loss in efficiency.

SUMMARY OF THE INVENTION

A tip turbine engine according to the present invention has a more efficient core airflow path from the hollow fan blades through to the combustion chamber of the combustor.

The turbine engine includes a rotatable fan having a plurality of radially-extending fan blades each defining compressor chambers extending radially therein. A turbine is mounted to the outer periphery of the fan. A diffuser at a radially outer end of each compressor chamber turns core airflow through the compressor chamber toward an annular combustor disposed in front of the turbine. Thus, in the tip turbine engine according to the present invention, the high velocity, high pressure core airflow from the compressor chambers in the hollow fan blades is diffused before the compressed core airflow enters the combustor, thereby improving the efficiency of the tip turbine engine. Further, the overall diameter of the tip turbine engine is reduced by the arrangement of the diffuser case in a position not directly radially outward of the fan blades.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
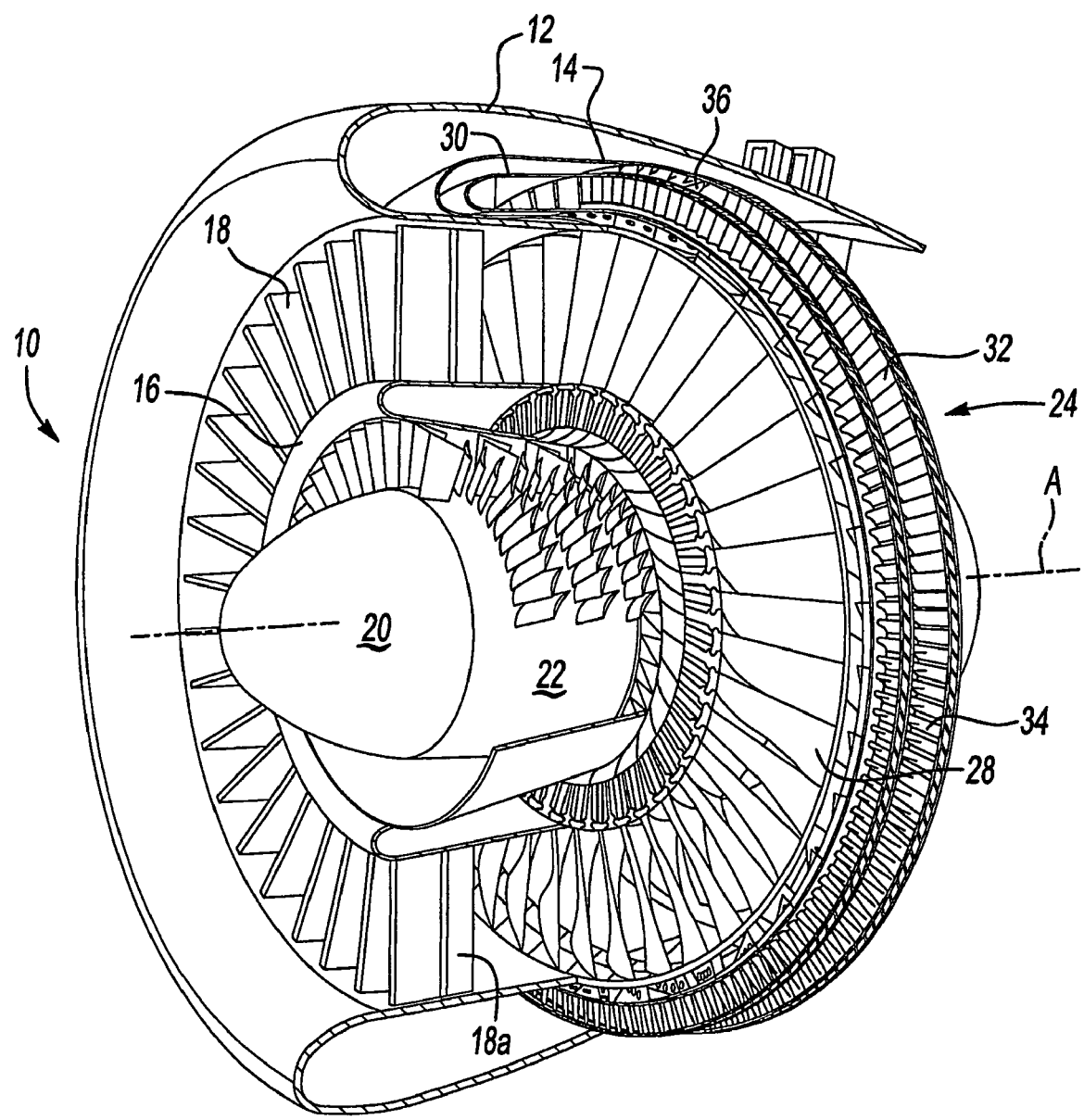
FIG. 1 is a partial sectional perspective view of a tip turbine engine according to the present invention.

FIG. 1 illustrates a general perspective partial sectional view of a tip turbine engine (TTE) type gas turbine engine 10. The engine 10 includes an outer nacelle 12, a rotationally fixed static outer support structure 14 and a rotationally fixed static inner support structure 16. A plurality of fan inlet guide vanes 18 are mounted between the static outer support structure 14 and the static inner support structure 16. Each inlet guide vane preferably includes a variable trailing edge 18A.

A nosecone 20 is preferably located along the engine centerline A to improve airflow into an axial compressor 22, which is mounted about the engine centerline A behind the nosecone 20.

A fan-turbine rotor assembly 24 is mounted for rotation about the engine centerline A aft of the axial compressor 22. The fan-turbine rotor assembly 24 includes a plurality of hollow fan blades 28 to provide internal, centrifugal compression of the compressed airflow from the axial compressor 22 for distribution to an annular combustor 30 located within the rotationally fixed static outer support structure 14.

A turbine 32 includes a plurality of tip turbine blades 34 (two stages shown) which rotatably drive the hollow fan blades 28 relative a plurality of tip turbine stators 36 which extend radially inwardly from the rotationally fixed static outer support structure 14. The annular combustor 30 is disposed axially forward of the turbine 32 and communicates with the turbine 32.

Figure 2:
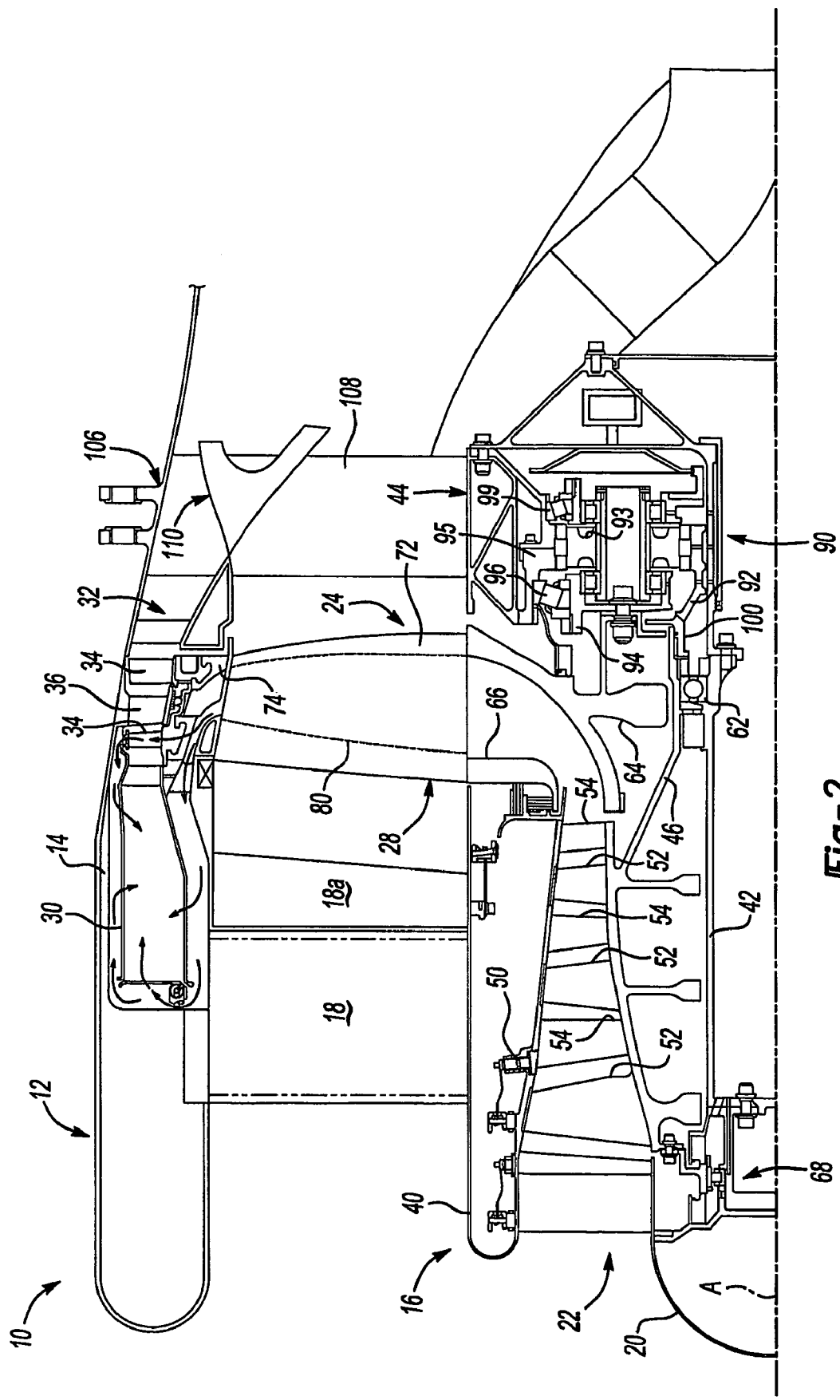
FIG. 2 is a longitudinal sectional view of the tip turbine engine of FIG. 1 taken along an engine centerline.

Referring to FIG. 2, the rotationally fixed static inner support structure 16 includes a splitter 40, a static inner support housing 42 and a static outer support housing 44 located coaxial to said engine centerline A.

The axial compressor 22 includes the axial compressor rotor 46, from which a plurality of compressor blades 52 extend radially outwardly, and a fixed compressor case 50. A plurality of compressor vanes 54 extend radially inwardly from the compressor case 50 between stages of the compressor blades 52. The compressor blades 52 and compressor vanes 54 are arranged circumferentially about the axial compressor rotor 46 in stages (three stages of compressor blades 52 and compressor vanes 54 are shown in this example). The axial compressor rotor 46 is mounted for rotation upon the static inner support housing 42 through a forward bearing assembly 68 and an aft bearing assembly 62.

The fan-turbine rotor assembly 24 includes a fan hub 64 that supports a plurality of the hollow fan blades 28. Each fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 which acts as a compressor chamber within the fan blade section 72 where the airflow is centrifugally compressed. From the core airflow passage 80, the airflow is diffused and turned once again by the diffuser section 74 toward an axial airflow direction toward the annular combustor 30. Preferably, the airflow is diffused axially forward in the engine 10, however, the airflow may alternatively be communicated in another direction.

All or substantially all of the airflow through the core airflow passage 80 is core airflow directed by the diffuser section 74 axially forward toward the combustor 30. Minimal amounts of airflow may be directed radially outwardly from the diffuser section 74 through the turbine blades 34 (paths not shown) to cool the tip turbine blades 34. This cooling airflow is then discharged through radially outer ends of the tip turbine blades 34 and then into the annular combustor 30. However, at least substantially all of the airflow is core airflow directed by the diffuser section 74 toward the combustor 30. As used herein, "core airflow" is airflow that flows to the combustor 30.

A gearbox assembly 90 aft of the fan-turbine rotor assembly 24 provides a speed increase between the fan-turbine rotor assembly 24 and the axial compressor 22, which in the embodiment shown is at a 3.34 ratio. In the embodiment shown, the gearbox assembly 90 is a planetary gearbox that provides co-rotating engagement between the fan-turbine rotor assembly 24 and an axial compressor rotor 46. Alternatively, a counter-rotating planetary gearbox could be provided. The gearbox assembly 90 is mounted for rotation between the static inner support housing 42 and the static outer support housing 44.

The gearbox assembly 90 includes a sun gear 92, which rotates with the axial compressor 22, and a planet carrier 94, which rotates with the fan-turbine rotor assembly 24 to provide a speed differential therebetween. A plurality of planet gears 93 (one shown) are mounted to the planet carrier 94. The planet gears 93 engage the sun gear 92 and a ring gear 95. The gearbox assembly 90 is mounted for rotation between the sun gear 92 and the static outer support housing 44 through a forward bearing 96 and a rear bearing 99. The forward bearing 96 and the rear bearing 99 are both tapered roller bearings and both handle radial loads. The forward bearing 96 handles the aft axial load, while the rear bearing 99 handles the forward axial loads. The sun gear 92 is rotationally engaged with the axial compressor rotor 46 at a splined interconnection 100 or the like.

It should be noted that the gearbox assembly 90 could utilize other types of gear arrangements or other gear ratios and that the gearbox assembly 90 could be located at locations other than aft of the axial compressor 22. For example, the gearbox assembly 90 could be located at the front end of the axial compressor 22. Alternatively, the gearbox assembly 90 could provide a speed decrease between the fan-turbine rotor assembly 24 and the axial compressor rotor 46.

Figure 3:
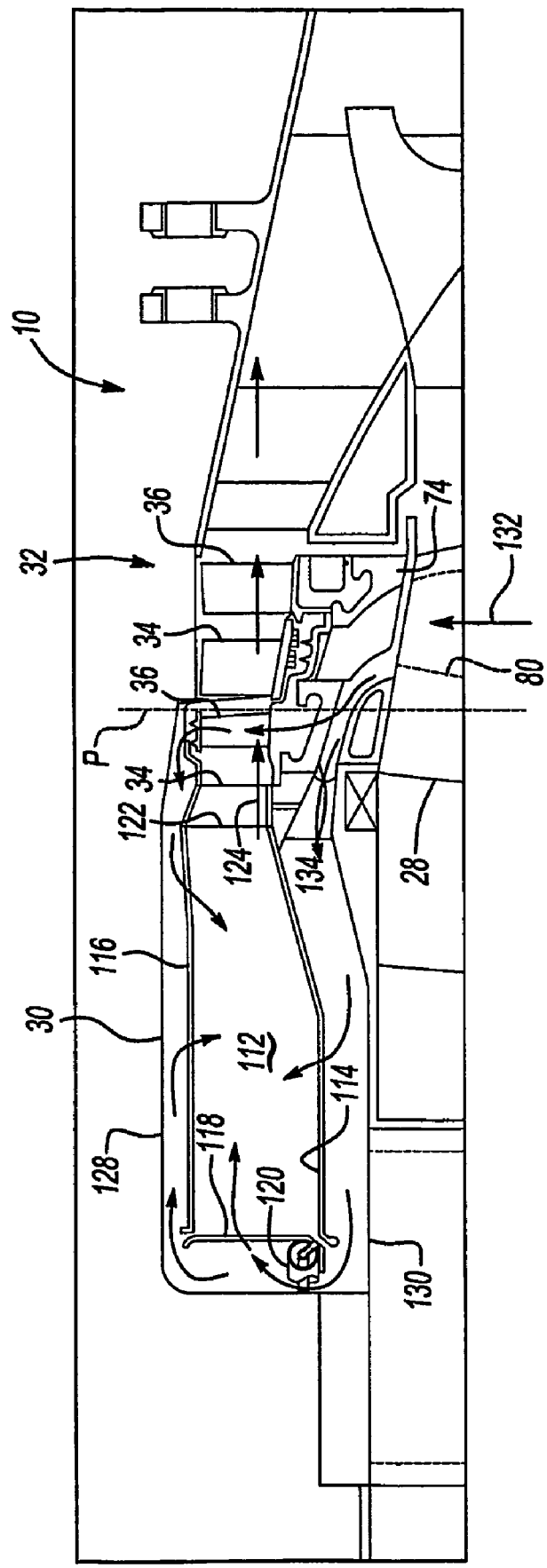
FIG. 3 is an enlarged view of the diffuser, combustor and turbine area of FIG. 2.

The annular combustor 30 and turbine 32 are shown in greater detail in FIG. 3. The annular combustor 30 is located entirely fore of a fan plane P, within which the fan blades 28 rotate. The annular combustor 30 includes an annular combustion chamber 112 defined between an annular inner combustion chamber wall 114 and annular outer combustion chamber wall 116. A forward wall 118 at a forward end of the combustion chamber 112 has mounted thereto a fuel injector 120, which directs fuel into the combustion chamber 112. The combustion chamber 112 includes a combustion chamber outlet 122 opposite the forward wall 118. The combustion chamber outlet 122 is substantially axially aligned with the forward wall 118 such that a substantially axial combustion path 124 is defined through the combustion chamber 112. The annular inner and outer combustion chamber walls 114, 116 and the forward wall 118 are perforated to permit core airflow into the combustion chamber 112.

An annular diffuser case 128 substantially encloses the annular inner and outer combustion chamber walls 114, 116 and the forward wall 118. An inner diffuser case wall 130 defines a core airflow path 132 with the annular inner combustion chamber wall 114. A core airflow path inlet 134 is axially aligned (i.e. along an axis parallel to the engine centerline A (FIG. 1)) with the diffuser section 74 and is substantially radially aligned (i.e. along a radius from engine centerline A) with the combustion chamber outlet 122. The core airflow path inlet 134 leads into the combustion chamber 112 through the annular inner and outer combustion chamber walls 114, 116 and the forward wall 118.

In operation, referring to FIG. 2, air enters the axial compressor 22, where it is compressed by the three stages of the compressor blades 52 and compressor vanes 54. The compressed air from the axial compressor 22 enters the inducer section 66 in a direction generally parallel to the engine centerline A, and is then turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow is turned and diffused axially forward in the engine 10 by diffuser section 74 into core airflow path inlet 134 of the annular combustor 30, as shown in FIG. 3. This diffusion improves the efficiency, by reducing the losses encountered when the compressed core airflow enters the larger combustion chamber 112. The diffused compressed core airflow from the hollow fan blades 28 then flows radially outwardly and through the annular inner and outer combustion chamber walls 114, 116 and the forward wall 118 to the combustion chamber 112 where it is mixed with fuel and ignited to form a high-energy gas stream.

The high-energy gas stream expands and follows the combustion path 124, which is substantially axial all the way from the forward wall 118 of the combustion chamber 112 through the combustion chamber outlet 122 and through the tip turbine blades 36. The high-energy gas stream rotatably drives the plurality of tip turbine blades 34 mounted about the outer periphery of the fan-turbine rotor assembly 24 to drive the fan-turbine rotor assembly 24, which in turn drives the axial compressor 22 via the gearbox assembly 90. Because the combustion path 124 is substantially axial, the efficiency of the combustor 30 is improved over the known combustors in tip turbine engines. Additionally, because the combustor 30 is located fore of the fan blades 28 and is not located the fan plane P, the tip turbine engine 10 has a smaller diameter than the known tip turbine engines.

The fan-turbine rotor assembly 24 discharges fan bypass air axially aft to merge with the core airflow from the turbine 32 in an exhaust case 106. A plurality of exit guide vanes 108 are located between the static outer support housing 44 and the rotationally fixed static outer support structure 14 to guide the combined airflow out of the engine 10 and provide forward thrust. An exhaust mixer 110 mixes the airflow from the turbine blades 34 with the bypass airflow through the fan blades 28.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A turbine engine comprising:
   a fan rotatable about an axis, the fan including a plurality of radially-extending fan blades, at least one of the fan blades defining a compressor chamber extending radially therein;
   a combustor partially defining a combustion path extending axially within a combustion chamber through a combustion chamber outlet, the combustion path extending axially aft of the combustion chamber outlet; and a diffuser at a radially outer end of the compressor chamber, the diffuser turning core airflow from the compressor chamber toward the combustor, the diffuser disposed radially inward of the combustion path and wherein the diffuser turns at least substantially all of the core airflow from the compressor chamber from a radial direction to an axial direction toward the combustor.

2. The turbine engine of claim 1 wherein the fan is rotatable about the axis in a fan plane and wherein the combustion path is radially outward of the diffuser in the fan plane.

3. A turbine engine comprising:
   a fan rotatable about an axis in a fan plane, the fan including a plurality of radially-extending fan blades, at least one of the fan blades defining a compressor chamber extending radially therein, wherein the combustion path is radially outward of the diffuser in the fan plane;
   a combustor partially defining a combustion path extending axially within a combustion chamber through a combustion chamber outlet, the combustion path extending axially aft of the combustion chamber outlet; and
   a diffuser at a radially outer end of the compressor chamber, the diffuser turning core airflow from the compressor chamber toward the combustor, the diffuser disposed radially inward of the combustion path; and
   a turbine at an outer circumference of the fan aft of the combustor, the fan rotatably driven by the turbine and the turbine rotatably driven by the combustor, the combustor path extending axially rearwardly from the combustion chamber through the combustion chamber outlet and then through the turbine.

4. The turbine engine of claim 3 wherein the combustor generates a high-energy gas stream to drive the turbine.

5. The turbine engine of claim 1 wherein the combustion path extends axially from a forward end of the combustion chamber to the combustion chamber outlet at a rearward end of the combustion chamber.

6. A turbine engine comprising:
   a fan rotatable about an axis, the fan including a plurality of radially-extending fan blades, at least one of the fan blades defining a compressor chamber extending radially therein;
   a combustor partially defining a combustion path extending axially within a combustion chamber through a combustion chamber outlet, the combustion path extending axially aft of the combustion chamber outlet, wherein the combustion path extends axially from a forward end of the combustion chamber to the combustion chamber outlet at a rearward end of the combustion chamber; and
   a diffuser at a radially outer end of the compressor chamber, the diffuser turning core airflow from the compressor chamber toward the combustor, the diffuser disposed radially inward of the combustion path
   a turbine at an outer circumference of the fan aft of the combustor, the fan rotatably driven by the turbine and the turbine rotatably driven by the combustor, the combustor path extending axially rearwardly from the forward end of the combustion chamber through the combustion chamber outlet and then through the turbine.

7. The turbine engine of claim 1 wherein the diffuser turns at least substantially all of the core airflow forward of the at least one fan blade.

8. The turbine engine of claim 1 wherein the core airflow from the diffuser flows generally axially and then radially into the combustion chamber.

9. A turbine engine comprising:
   a fan rotatable about an axis, the fan including a plurality of fan blades, at least one fan blade defining a compressor chamber therein, the compressor chamber centrifugally compressing core airflow therein;
   a diffuser turning at least substantially all of the core airflow from the compressor chamber from a substantially radial direction toward a generally axial direction;
   a combustor receiving core airflow from the diffuser; and
   a turbine mounted to outer ends of the fan blades radially outwardly of the diffuser and aft of the combustor.

10. The turbine engine of claim 9 wherein the diffuser turns the core airflow from the compressor chamber toward an axially forward direction.

11. The turbine engine of claim 9 further including an axial compressor, wherein the at least one fan blade further includes at least one inducer at a radially inward end of the compressor chamber, the at least one inducer turning substantially axial flow from the axial compressor toward substantially radial flow in the compressor chamber.

12. The turbine engine of claim 9 wherein the core airflow from the diffuser flows generally axially forward and then radially into a combustion chamber of the combustor.

13. The turbine engine of claim 12 wherein the core airflow from the diffuser flows generally axially forward and then radially outwardly into the combustion chamber of the combustor.

14. The turbine engine of claim 9 wherein none of the core airflow flows radially from the at least one fan blade into the combustor.

15. A method for operating a turbine engine including the steps of:
   a) centrifugally compressing core airflow within each of a plurality of fan blades rotating in a plane;
   b) turning at least substantially all of the compressed core airflow out of the plane toward a combustion chamber, wherein none of the core airflow flows radially from the fan blades into the combustion chamber; and c) mixing the compressed core airflow with fuel only after the compressed core airflow is turned out of the plane in said step b).

16. The method of claim 15 wherein the plane does not intersect the combustion chamber.

17. The method of claim 15 wherein all of the compressed core airflow is turned out of the plane toward the combustion chamber in said step b).

18. The method of claim 15 wherein at least substantially all of the compressed core airflow is turned axially forward out of the plane toward the combustion chamber in said step b).

* * * * *